US008868328B1

(12) United States Patent
Estkowski

(10) Patent No.: US 8,868,328 B1
(45) Date of Patent: Oct. 21, 2014

(54) SYSTEM AND METHOD FOR ROUTING DECISIONS IN A SEPARATION MANAGEMENT SYSTEM

(71) Applicant: The Boeing Company, Chicago, IL (US)

(72) Inventor: Regina Inez Estkowski, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/909,075

(22) Filed: Jun. 4, 2013

(51) Int. Cl.
*G08G 5/04* (2006.01)
*G01C 21/00* (2006.01)

(52) U.S. Cl.
CPC ................ *G01C 21/00* (2013.01); *G08G 5/045* (2013.01)
USPC .......................................................... 701/301

(58) Field of Classification Search
CPC ....... G08G 5/045; G08G 5/006; G05D 1/104; G05D 1/0202; G05D 1/0214; B60W 30/09; B62D 15/0265; B60T 2201/087
USPC .......................................................... 701/301
See application file for complete search history.

(56) References Cited

U.S. PATENT DOCUMENTS

| | | | | |
|---|---|---|---|---|
| 5,502,638 | A * | 3/1996 | Takenaka | 701/87 |
| 5,631,640 | A * | 5/1997 | Deis et al. | 340/961 |
| 5,913,919 | A * | 6/1999 | Bauer et al. | 701/301 |
| 6,097,996 | A * | 8/2000 | Deker | 701/10 |
| 6,424,889 | B1 * | 7/2002 | Bonhoure et al. | 701/3 |
| 6,531,978 | B2 * | 3/2003 | Tran | 342/29 |
| 6,926,374 | B2 * | 8/2005 | Dudeck et al. | 303/191 |
| 7,447,593 | B2 * | 11/2008 | Estkowski et al. | 701/301 |
| 7,647,178 | B2 * | 1/2010 | Ekmark et al. | 701/301 |
| 7,737,878 | B2 * | 6/2010 | van Tooren et al. | 342/29 |
| 8,060,295 | B2 * | 11/2011 | Estkowski et al. | 701/120 |

(Continued)

FOREIGN PATENT DOCUMENTS

| | | | | |
|---|---|---|---|---|
| DE | 102008000941 A1 * | 10/2009 | .............. | B62D 5/00 |
| EP | 1369665 A2 * | 12/2003 | .............. | G01C 5/00 |

OTHER PUBLICATIONS

Albaker, B.M. et al. "A conceptual framework and a review of conflict sensing, detection, awareness and escape maneuvering methods for UAVs", Sep. 2011, Chapter 21 (23 pages), downloaded from http://cdn.intechopen.com/pdfs-wm/19544.pdf.*

(Continued)

*Primary Examiner* — Behrang Badii
*Assistant Examiner* — David Testardi
(74) *Attorney, Agent, or Firm* — Yee & Associates, P.C.

(57) ABSTRACT

A method comprising computer receiving at least one of time and location-referenced state data for an object of interest, determining present location of a vehicle within two presently overlapping fat paths, fat paths comprising homotopically distinct regions of travel, determining distance of vehicle from a point of divergence of fat paths, fat paths diverging to avoid object, the computer generating a decision boundary reachable prior in time to point of divergence wherein decision boundary is in advance of the present location of vehicle, computer generating a first second set of feasible headings for the vehicle, the first and second set respectively associated with a projected first and second crossing points of the decision boundary by vehicle wherein feasible headings promote positioning of vehicle in one of fat paths beyond point of divergence, and computer sending first and second sets of feasible headings to vehicle prior to vehicle reaching decision boundary.

19 Claims, 12 Drawing Sheets

(56) References Cited

U.S. PATENT DOCUMENTS

| | | | | |
|---|---|---|---|---|
| 8,150,583 | B2 * | 4/2012 | Danner et al. | 701/45 |
| 8,392,062 | B2 * | 3/2013 | Oechsle et al. | 701/41 |
| 8,401,782 | B2 * | 3/2013 | Eidehall | 701/301 |
| 8,423,277 | B2 * | 4/2013 | Shirato | 701/301 |
| 8,630,762 | B2 * | 1/2014 | Staempfle et al. | 701/23 |
| 2006/0282218 | A1 * | 12/2006 | Urai et al. | 701/301 |
| 2007/0050101 | A1 * | 3/2007 | Sacle et al. | 701/11 |
| 2007/0179685 | A1 * | 8/2007 | Milam et al. | 701/3 |
| 2012/0265380 | A1 * | 10/2012 | Kuwata et al. | 701/21 |
| 2014/0005875 | A1 * | 1/2014 | Hartmann et al. | 701/23 |

OTHER PUBLICATIONS

Albaker, B.M. et al., "Straight projection conflict detection and cooperative avoidance for autonomous unmanned aircraft systems", 4th IEEE Conf. on Industrial Electronics and Applications, 2009, (ICIEA 2009), pp. 1965ff.*

Eidehall, Andreas, "Multi-target threat assessment for automotive applications", 14th International IEEE Conference on Intelligent Transportation Systems, Washington, DC, Oct. 5-7, 2011, pp. 433ff.*

McNaughton, Matthew, "Parallel algorithms for real-time motion planning", Ph.D Thesis, Carnegie Mellon University, Jul. 2011, 233 pages.*

EPO machine translation of EP 1369665 (original EP document published Dec. 10, 2003).*

Estkowski et al., "Systems and Methods for Collaboratively Controlling at Least One Aircraft," U.S. Appl. No. 13/692,633, filed Dec. 3, 2012, 39 pages.

* cited by examiner

SYSTEM AND METHOD FOR ROUTING DECISIONS IN A SEPARATION MANAGEMENT SYSTEM

BACKGROUND INFORMATION

1. Field

The present disclosure relates generally to routing of vehicles to maintain separation of vehicles and to avoid obstacles. More particularly, the present disclosure relates to systems and methods of supporting routing decisions in a separation management system.

2. Background

Aircraft and other vehicles in motion may encounter many moving and stationary obstacles. Moving obstacles include other aircraft, flocks of birds, and weather systems. Stationary obstacles include natural objects, such as terrain, and man-made objects, such as towers and buildings. An aircraft moving along its flight path may be required to change headings numerous times due to expected and unexpected obstacles. The operator of the aircraft may seek to execute heading changes that maintain adherence to scheduled arrival time while observing constraints regarding speed, altitude, safety, and passenger comfort.

SUMMARY

The illustrative embodiments provide for a method using a computer in conjunction with a non-transitory computer readable storage medium. The method comprises the computer receiving at least one of time-referenced and location-referenced state data for an object of interest. The method also comprises the computer determining a present location of a control vehicle within two presently overlapping fat paths wherein a fat path comprises a homotopically distinct region of travel. The method also comprises the computer determining distance of the control vehicle from a point of divergence of the fat paths, the fat paths diverging to avoid the object of interest. The method also comprises the computer generating a decision boundary reachable prior in time to the point of divergence wherein the decision boundary is in advance of the present location of the control vehicle. The method also comprises the computer generating a first set of feasible headings and a second set of feasible headings for the control vehicle, the first set and the second set respectively associated with a projected first crossing point and a projected second crossing point of the decision boundary by the control vehicle wherein feasible headings promote positioning of the control vehicle in one of the fat paths beyond the point of divergence. The method also comprises the computer sending the first set of feasible headings and the second set of feasible headings to the control vehicle prior to the control vehicle reaching the decision boundary.

The illustrative embodiments also provide an apparatus. The apparatus comprises an aircraft comprising a fuselage configured for flight and a computer, comprising a bus, a processor connected to the bus, and a memory connected to the bus, the memory storing program code which, when executed by the processor, performs a computer-implemented method. The program code comprises program code for performing, using the processor, receiving time-referenced state data for an object of interest. The program code also comprises program code for performing, using the processor, determining feasible routing path options for at least the aircraft. The program code also comprises program code for performing, using the processor, generating at least one decision boundary for selection of at least one routing path option from the feasible routing path options. The program code also comprises program code for performing, using the processor, determining at least one heading range from a crossing point of the decision boundary within the at least one routing path option, wherein the at least one heading range keeps multiple fork options open and promotes avoidance of the object of interest by the aircraft, the object of interest comprising at least one of a moving vehicle, a stationary object, a terrain object, a no-fly zone, a restricted operating zone, and a weather system proximate the aircraft.

The illustrative embodiments also provide a method using a computer in conjunction with a non-transitory computer readable storage medium. The method comprises a computer receiving four-dimensional virtual predictive radar data for a control vehicle from a separation management system. The method also comprises the computer determining intersections of fat paths for the control vehicle extracted from the four dimensional virtual predictive radar data, wherein fat paths comprise homotopically distinct regions of travel. The method also comprises the computer determining intersection forks associated with the intersections of the fat routing paths. The method also comprises the computer selecting a first intersection fork based on metrics calculated for the determined intersection forks. The method also comprises the computer determining at least one event horizon associated with the first intersection fork, wherein observation of the at least one event horizon by the control vehicle prevents the control vehicle from entering an area containing forbidden heading ranges.

The features, functions, and benefits may be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
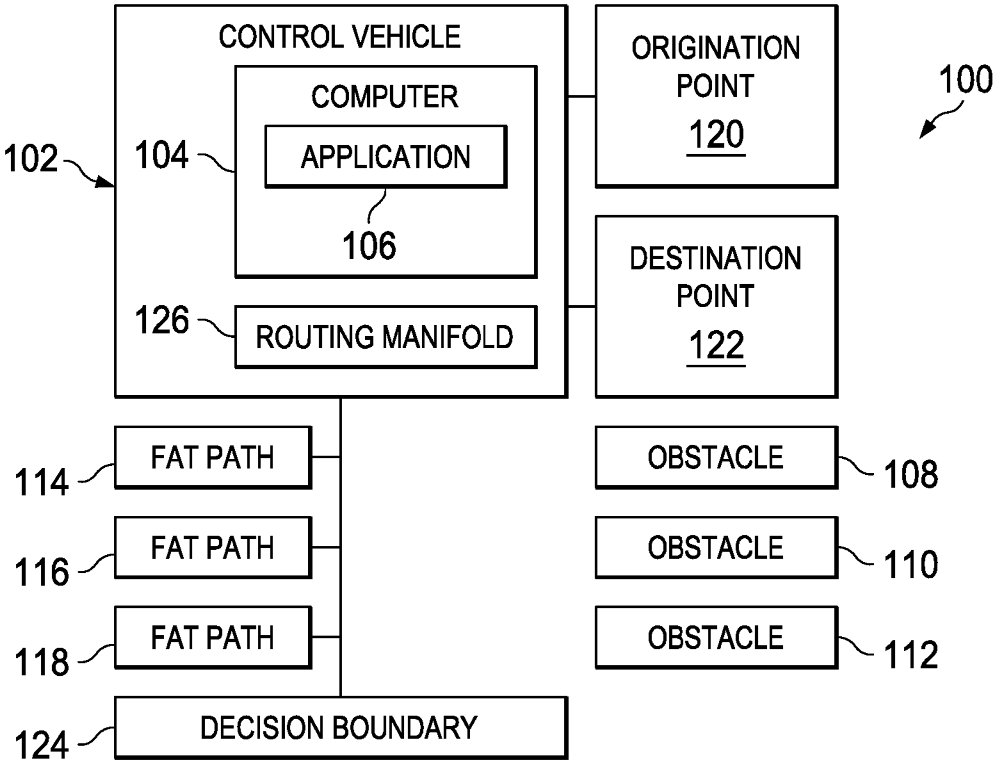
FIG. 1 is an illustration of a block diagram of a system of routing decisions in a separation management system.

An aircraft may follow at least one homotopically distinct region of travel, referred to herein as a "fat path." A plurality of fat paths may be calculated between a time referenced position of an aircraft and reference point based on maneuvering characteristics of the aircraft and a probabilistic zone of interest for other aircraft. A separation management system receives and filters aircraft and airspace information about a control aircraft and other aircraft the control aircraft seeks to avoid. Trajectory windows for each aircraft may be determined and monitored with respect to time and probable location. The separation management system determines when trajectory overlap may occur and may reroute the control vehicle. A virtual predictive radar screen may display a plurality of trajectory paths for a control vehicle and may include time rings predicting the location of the control vehicle in three-dimensional space. Based on maneuverability characteristics and speed of the control vehicle, constraints may be placed on the control vehicle. When a second vehicle is detected near one of the time rings of the control vehicle, a fat path may be generated along a subset of the plurality of trajectory paths to maintain separation of the control vehicle from the second vehicle.

Homotopically distinct regions of travel, hereinafter "fat paths", separation management systems, virtual predictive radar, and their supporting methods and systems are described in further detail in "Automated Separation Manager", U.S. Pat. No. 8,060,295 dated Nov. 15, 2011, which is incorporated by reference herein in its entirety. Also incorporated by reference in its entirety is U.S. patent application Ser. No. 13/692,633 entitled "Systems and Methods for Controlling At Least One Aircraft", filed Dec. 3, 2012.

The illustrative embodiments recognize and take into account the issues described above regarding the need for a control vehicle, for example an aircraft, to be provided navigation and heading information well in advance of reaching decision points. The illustrative embodiments provide methods for aiding decision-making in maintaining safe separation between an aircraft and other objects and regions of avoidance. State data for objects of interest, for example other aircraft, that are referenced by time and location is gathered. Maneuver manifold information for the subject aircraft including constraints for speed, altitude, safety and passenger comfort is received. Currently feasible routing options for the subject aircraft are determined. Based on information about the objects of interest, maneuver manifold information, and the currently feasible routing path options, the illustrative embodiments provide for determination of decision boundaries and heading ranges for the subject aircraft. Heading ranges may be determined from points where the subject aircraft is located and from points where the subject aircraft is not located. Illustrative embodiments provide methods for determining heading ranges that are feasible and for determining heading ranges that are forbidden.

At any point along an aircraft flight path, objects of interest may lie between the aircraft and points ahead of the aircraft along an intended flight path of the aircraft. One or more homotopically distinct regions of travel, referred to herein as fat paths, may be mapped for the aircraft between any point on its path and destination points. The fat paths are based on distance to destination, maneuver constraints, and objects of interest to be avoided along the way, some of which may themselves be in motion.

As an aircraft travels, it may have options of several fat paths to follow. At times, two or more fat paths may overlap one another. The aircraft may be flying within two or more fat paths during some periods. When the aircraft is presently traveling in an intersection of two fat paths and is approaching an obstacle, the fat paths may diverge to avoid the obstacle. Two or more overlapping fat paths may diverge for reasons unrelated to obstacles.

When overlapping fat paths diverge or are known to be diverging ahead, whether in the face of an obstacle or not, options available to the aircraft are called "fork options." The operator of the aircraft or other party in control may choose which fork option to take. In other words, the operator may choose which fat path or combinations of overlapping fat paths to follow. The decision of which fork option to choose may be made while remaining on schedule to reach the destination on time, all the while observing the constraints including speed, altitude, safety, and comfort. The illustrative embodiments may assist in achieving these objectives.

Prior to the points in time and in space wherein two or more overlapping fat paths diverge in the face of an increasingly proximate stationary or moving obstacle, the illustrative embodiments provide that a decision boundary may be determined for the aircraft. The decision boundary is a simply connected set of points reached by the aircraft before the divergence point. The decision boundary is located far enough in advance of the obstacle and the fat path divergence point that the aircraft may be provided a range of choices of safe headings from which to choose. For each point along the decision boundary that the aircraft may cross, illustrative embodiments provide at least one heading range for the aircraft to safely follow. The heading ranges may keep open multiple fork options. In other words, even after reaching the decision boundary, the aircraft may have two or more available options of fat paths to follow to bypass the obstacle. The illustrative embodiments provide heading ranges that may be optimized so that routing options are maximized for the aircraft.

The decision boundary may also be a time or location at which the aircraft must be on a route to at least one of the fork options in order to maintain the maneuver and safety constraints. The decision boundary may be expressed as a range of times or simply as a connected set of points at which the aircraft must initiate an action to turn or maintain course on a route to one of the routing options to maintain the maneuver and safety constraints. Because the decision boundary is determined in advance of the aircraft reaching it, it may not be known where along the decision boundary that the aircraft will cross the decision boundary. Since headings may depend on the aircraft's location at the time it crosses the decision boundary, the illustrative embodiments provide for a plurality of headings to be calculated and made available to the aircraft, ground control, or others at the time the decision boundary is determined.

Attention is now turned to the figures. FIG. 1 is an illustration of a block diagram of a system 100 of routing decisions in a separation management system. System 100 includes control vehicle 102, computer 104, application 106, obstacle 108, obstacle 110, obstacle 112, fat path 114, fat path 116, fat path 118, origination point 120, destination point 122, decision boundary 124, and routing manifold 126.

Control vehicle 102 may be an aircraft including fixed wing airplane, helicopter, glider, balloon, blimp, or unmanned aircraft. Control vehicle 102 may be watercraft including ship or submarine. Control vehicle 102 may be a land-based vehicle.

Computer 104 may be a general purpose computer. General purpose computers are described with respect to FIG. 15. Computer 104 may be situated aboard control vehicle 102. Computer 104 may be situated at a ground location, for example at an air traffic control center. Computer 104 may be multiple computers working together towards a goal, including computers in different physical locations.

Application 106 may execute on computer 104 and may execute the actions provided herein regarding setting boundaries in time and space in which operators of control vehicle 102 make decisions regarding headings. In an embodiment, portions of application 106 may execute on more than one computer 104 that may be situated at more than one location or aboard more than one aircraft or other vehicle.

Obstacle 108, obstacle 110, and obstacle 112 may include aircraft, balloons, gliders, unmanned aerial vehicles that may be stationary or in motion. Obstacle 108, obstacle 110, obstacle 112 also may include flocks of birds, weather systems, and any other object either stationary or in motion that control vehicle 102 desires to avoid. Obstacle 108, obstacle 110, and obstacle 112 may also be ground-based and be a natural object such as terrain comprising mountain ranges for example, or may be man-made, for example a communications tower, a building, or a no-fly zone. In maritime embodiments, obstacle 108, obstacle 110, and obstacle 112 may be other ships, submarines, buoys, terrain, both submerged or not, and weather systems.

Fat path 114, fat path 116, and fat path 118 are homotopically distinct regions of travel. Fat path 114, fat path 116, and fat path 118 may be calculated between a time referenced position of control vehicle 102 and a reference point based on maneuvering characteristics of control vehicle 102 and a probabilistic zone of interest for obstacle 108, obstacle 110, and obstacle 112 including other aircraft. Fat path 114, fat path 116, and fat path 118 is a maximal simply connected region contained in routing manifold 126 wherein the region is such that for each point in the region there exists a feasible route for control vehicle 102 that contains the point, that begins at origination point 120 and ends at destination point 122. A route for control vehicle 102 is feasible if the route satisfies scheduling requirements and constraints and is physically possible.

Given a set of obstacle 108, obstacle 110, and obstacle 112 to avoid, maneuver and operational constraints for control vehicle 102, origination point 120, destination point 122, and routing manifold 126 may be a union of possible paths in space and time from a start state to an end state that satisfy constraints and avoid obstacle 108, obstacle 110, and obstacle 112. Maneuver and operational constraints may include speed, altitude, safety, and passenger comfort.

Decision boundary 124 is a simply connected set of points in at least one of time and space. In order to maintain a feasible path, upon reaching a point along decision boundary 124, control vehicle 102 must be either on a path that transitions to a fork option including one or more of fat path 114, fat path 116, and fat path 118 or initiate a change of heading onto a different fat path that transitions to a different one of fat path 114, fat path 116, and fat path 118. Decision boundary 124 is also referred herein to as an "event horizon" and as a "practical event horizon."

Additional components and concepts are defined herein. A fat path identifier is a number, symbol, word or phrase that uniquely identifies any one of fat path 114, fat path 116, and fat path 118 in routing manifold 126. If "FP" is one of a fat path 114, fat path 116, and fat path 118, then FP=(R,i) where R is a region of time and space encompassed by FP and "i" is the identifier of FP.

A theoretical event horizon is a boundary associated with a fat path intersection and includes points in the fat path intersection such that there exists a feasible heading at the points such that a transition to each fat path option abutting an end point is theoretically possible. A theoretical event horizon is a simply connected set of points that partitions a maximal fat path intersection (described below) point set into a first and second connected sets such that, for any point in the first set, there exists a forbidden heading range (described below) located at the point. For any point in the second set there exists no forbidden heading range at the point.

A practical event horizon region is a region bounded by a decision boundary 124 and boundaries of one or more of fat path 114, fat path 116, and fat path 118. A theoretical event horizon region is a region bounded by theoretical event horizon and fat path boundaries.

An event horizon avoidance boundary is a boundary associated with decision boundary 124 or an event horizon wherein in order to avoid a practical event horizon region, control vehicle 102 must have initiated a maneuver onto a fat path option at the time of reaching event horizon avoidance boundary and may be unable to safely invoke a change of heading onto a different fat path option after reaching decision boundary 124, if the practical event horizon region is to be avoided. A forbidden heading fan is associated with a point in a fat path fork and includes a contiguous range of headings that are not feasible for any fork option.

An avoidance heading fan is associated with a point in a fat path fork and includes a contiguous range of headings that are not feasible for any fork option. A splitting curve is a curve in a fat path intersection where each curve point is associated with a heading and the curve splits available options according the heading behavior of control vehicle 102 along the curve. Maximum options are retained if a heading of control vehicle 102 at a point on the curve is the splitting curve associated heading.

If "FPI" is a maximal fat path intersection then FPI is associated with a region $R(FPI)=\cap_{i=1}^{n} fp_i$, where the $fp_i$ are fat paths and if fp is any fat path with $fp \cap R(FPI) \neq \emptyset$ then $fp=fp_i$ for some $i=1, \ldots, n$. FPI is also associated with a set of labels $L(FPI)=\{L(fp_i)\}_{i=1}^{n}$, where for each i, $L(fp_i)$ is a fat path identifier that uniquely identifies fat path $fp_i$. A fork option for FPI is a maximal fat path intersection $FPI^O$ such that 1) $L(FPI^O) \subset L(FPI)$; 2) $L(FPI) \subset L(FPI^O)$; 3) closure $(FPI^O) \cap closure(FPI) \neq \emptyset$; 4) there is a feasible path for control vehicle 102 that transitions from R(FPI) to $R(FPI^O)$.

Let FPI be a maximal fat path intersection and p be a point in R(FPI). Then a feasible heading range HR at p is a contiguous set of headings such that if $h \in HR$ then there is a feasible path through p such that control vehicle 102 following the path would have the heading h at p. A maximal feasible heading range is a feasible heading range that cannot be made larger.

A feasible heading range with respect to a fork option is a feasible heading range such that any heading in the heading range is feasible for the fork option. In this case there exists a path that transitions from the maximal fat path intersection to the fork option. A maximal feasible heading range with respect to a fork option is a feasible heading range with respect to a fork option that cannot be made larger.

A forbidden heading range at a point is a contiguous set of headings such that there exists no feasible path through the point such that control vehicle 102 following the path would have the heading at the point. Forbidden heading range with respect to a fork is defined as follows: given a point in a maximal fat path intersection, a forbidden heading range at the point is a contiguous set of headings such that for any heading in the range, there is no fork option for which the heading is feasible.

The illustrative embodiments shown in FIG. 1 are not meant to imply physical or architectural limitations to the manner in which different illustrative embodiments may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

Figure 2:
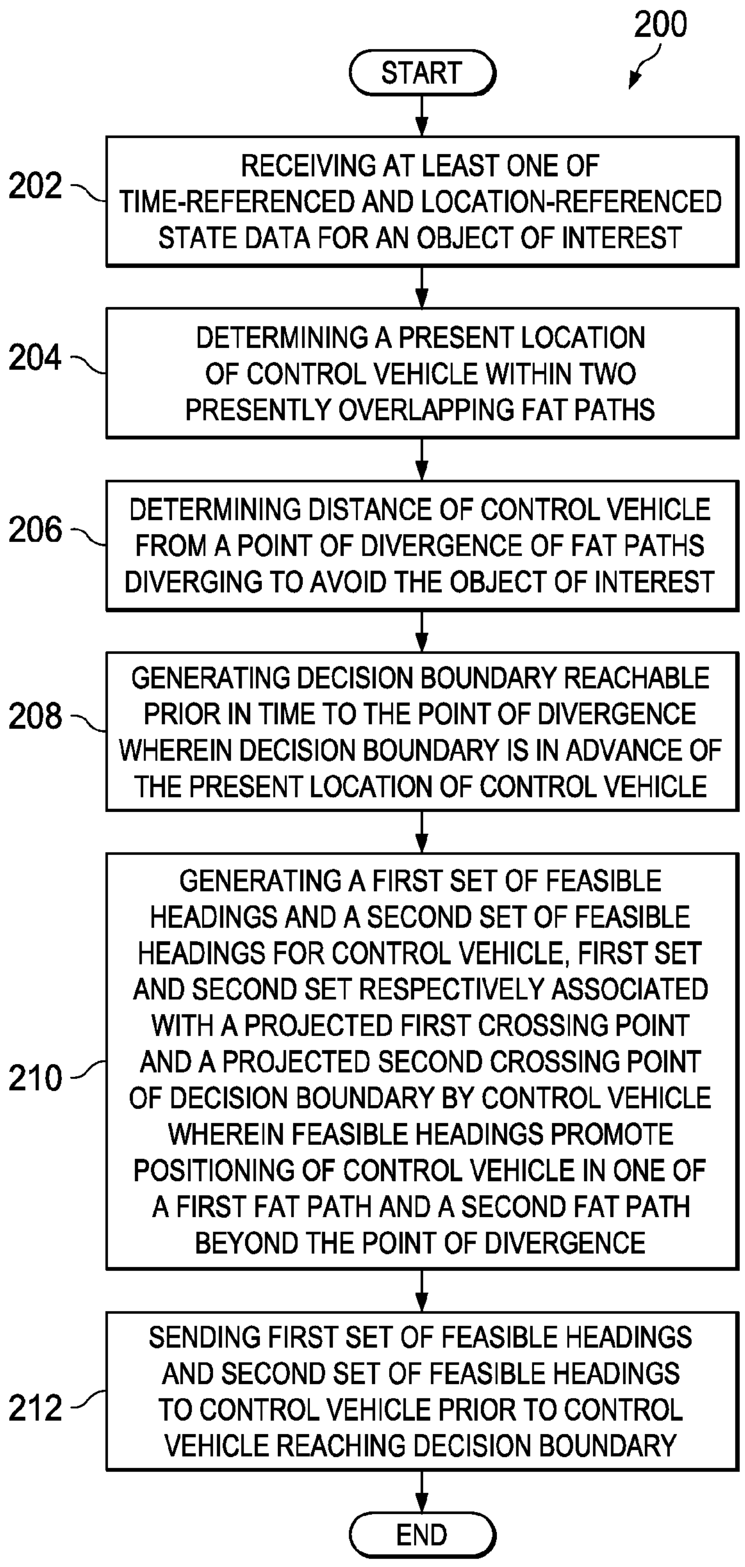
FIG. 2 is a flowchart of a method for routing systems in a separation management system in accordance with an illustrative embodiment.

FIG. 2 is a flowchart of a method for routing systems in a separation management system in accordance with an illustrative embodiment. Method 200 shown in FIG. 2 may be implemented using system 100 of FIG. 1. The process shown in FIG. 2 may be implemented by a processor, such as processor unit 1504 of FIG. 15. The process shown in FIG. 2 may be a variation of the processes shown in FIG. 1 and FIG. 3 through FIG. 14. Although the operations presented in FIG. 2 are described as being performed by a "process," the operations are being performed by at least one tangible processor or using one or more physical devices, as described elsewhere herein. The term "process" also includes computer instructions stored on a non-transitory computer readable storage medium.

Method 200 may begin as the process receives at least one of time-referenced and location-referenced state data for an object of interest (operation 202). Thus, computer 104 may receive at least one of time-referenced and location-referenced state data for an object of interest of FIG. 1. An object of interest may be one of obstacle 108, obstacle 110, and obstacle 112 of FIG. 1.

Next, the process may determine a present location of control vehicle within two presently overlapping fat paths. (operation 204). Thus, for example, computer 104 may determine a present location of control vehicle 102 within two presently overlapping fat paths, such as fat path 114 and fat path 116 of FIG. 1.

The process may determine distance of control vehicle from a point of divergence of fat paths diverging to avoid the object of interest (operation 206). For example, computer 104 may determine a distance of control vehicle 102 from a point of divergence of fat path 114 and fat path 116, fat path 114 and fat path 116 diverging to avoid the object of interest (operation 206).

Next, the process may generate a decision boundary reachable prior in time to the point of divergence wherein decision boundary is in advance of the present location of control vehicle (operation 208). For example, computer 104 may generate decision boundary 124 reachable prior in time to the point of divergence, wherein decision boundary 124 is in advance of the present location of control vehicle 102 of FIG. 1.

Next, the process may generate a first set of feasible headings and a second set of feasible headings for control vehicle, first set and second set respectively associated with a projected first crossing point and a projected second crossing point of decision boundary by control vehicle wherein feasible headings promote positioning of control vehicle in one of a first fat path and a second fat path beyond the point of divergence (operation 210). For example, computer 104 may generate a first set of feasible headings and a second set of feasible headings for control vehicle 102, first set and second set respectively associated with a projected first crossing point and a projected second crossing point of decision boundary 124 by control vehicle 102 wherein feasible headings promote positioning of control vehicle 102 in one of fat path 114 and fat path 116 beyond point of divergence of FIG. 1.

Next, the process may send a first set of feasible headings and second set of feasible headings to control vehicle prior to control vehicle reaching decision boundary (operation 212). For example, computer 104 may send a first set of feasible headings and second set of feasible headings to control vehicle 102 prior to control vehicle 102 reaching decision boundary 124 of FIG. 1. Method 200 may terminate thereafter.

Figure 3:
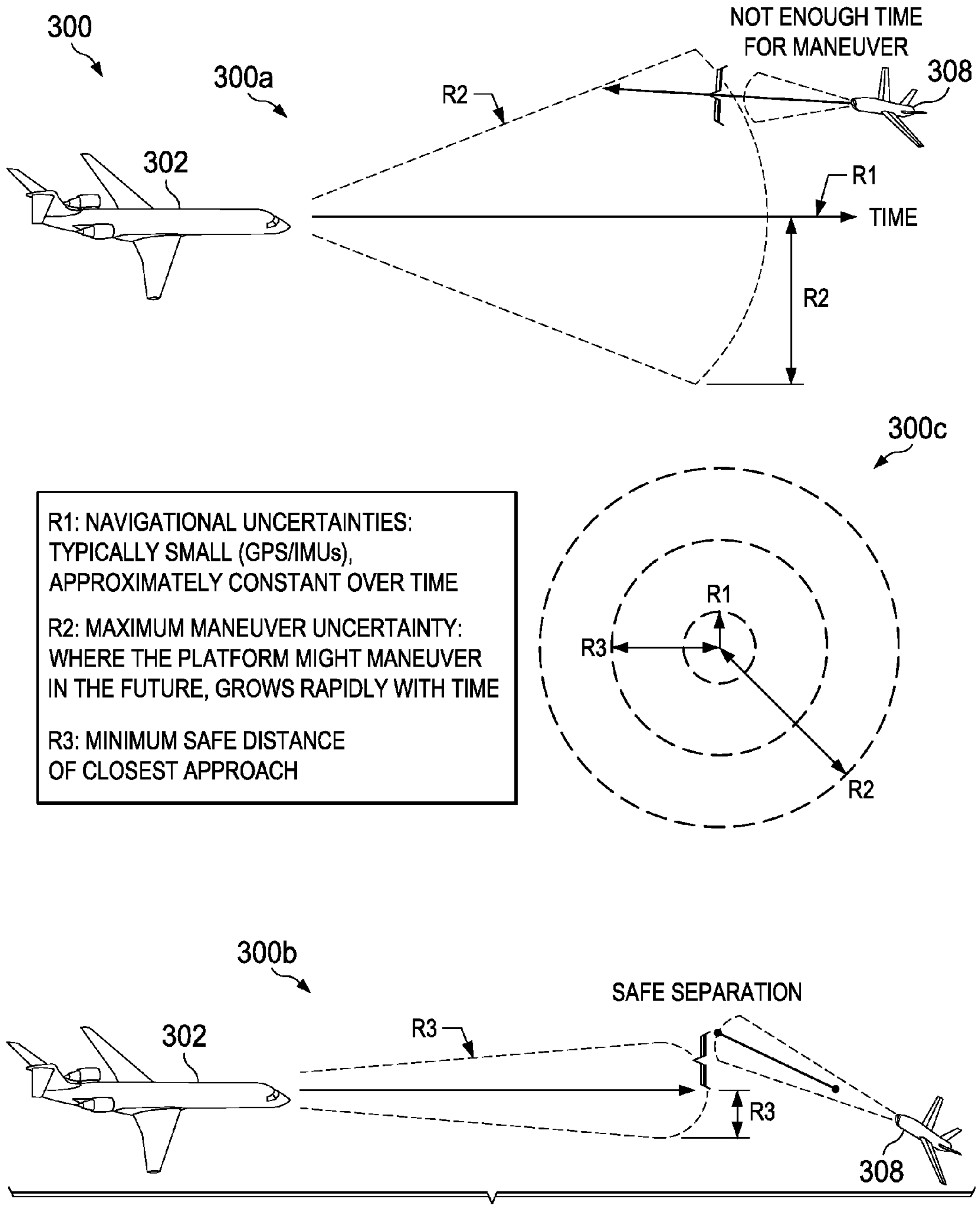
FIG. 3 is a diagram providing a schematic view of illustrative safe separation windows for aircraft with varying degrees of uncertainty according to an embodiment of the present disclosure.

FIG. 3 is a diagram providing a schematic view of illustrative safe separation windows for aircraft with varying degrees of uncertainty according to an embodiment of the present disclosure. FIG. 3 is at least partially adapted from U.S. Pat. No. 8,060,295 which is incorporated by reference herein in its entirety. FIG. 3 is provided for illustration purposes and depicts uncertainties to be considered in a separation management system upon which the systems and methods of the present disclosure may partially be based. Components shown in FIG. 3 are indexed to components shown in FIG. 1. Control vehicle 302 shown in FIG. 3 corresponds to control vehicle 102 shown in FIG. 1. Obstacle 308 shown in FIG. 3 corresponds to obstacle 108 shown in FIG. 1. FIG. 3 is a schematic view showing safe separation windows for aircraft with varying degrees of uncertainty.

FIG. 3 depicts two separate scenarios, labeled as **300*a* and 300*b*. Scenario 300*a* depicts an undesirable situation for control vehicle 302 because trajectory window R2 for control vehicle 302 is too broad such that collision with obstacle 308 may occur. Scenario 300*b* depicts conditions of safe separation for control vehicle 302 because trajectory window R3 is narrow such that control vehicle 302 and obstacle 308 will safely pass. Trajectory windows are further described in section 300*c* of FIG. 3 with trajectory window R1** resulting from environmental conditions, instrumentation limitations and/or tolerances, or other factors bearing on aircraft trajectory.

Routing manifold 126 may contain information about regions of uncertainty for pilots, ground control personnel and others, and may also contain information about regions of trajectories for control vehicle 102 of FIG. 1 and obstacle 108. System 100 also includes decision boundary 124 which provides a simply connected set of points, whereon being reached, operator of control vehicle 102 must make decisions regarding heading while still observing prior established constraints which may include information about regions of uncertainty and regions of trajectories.

Figure 4:
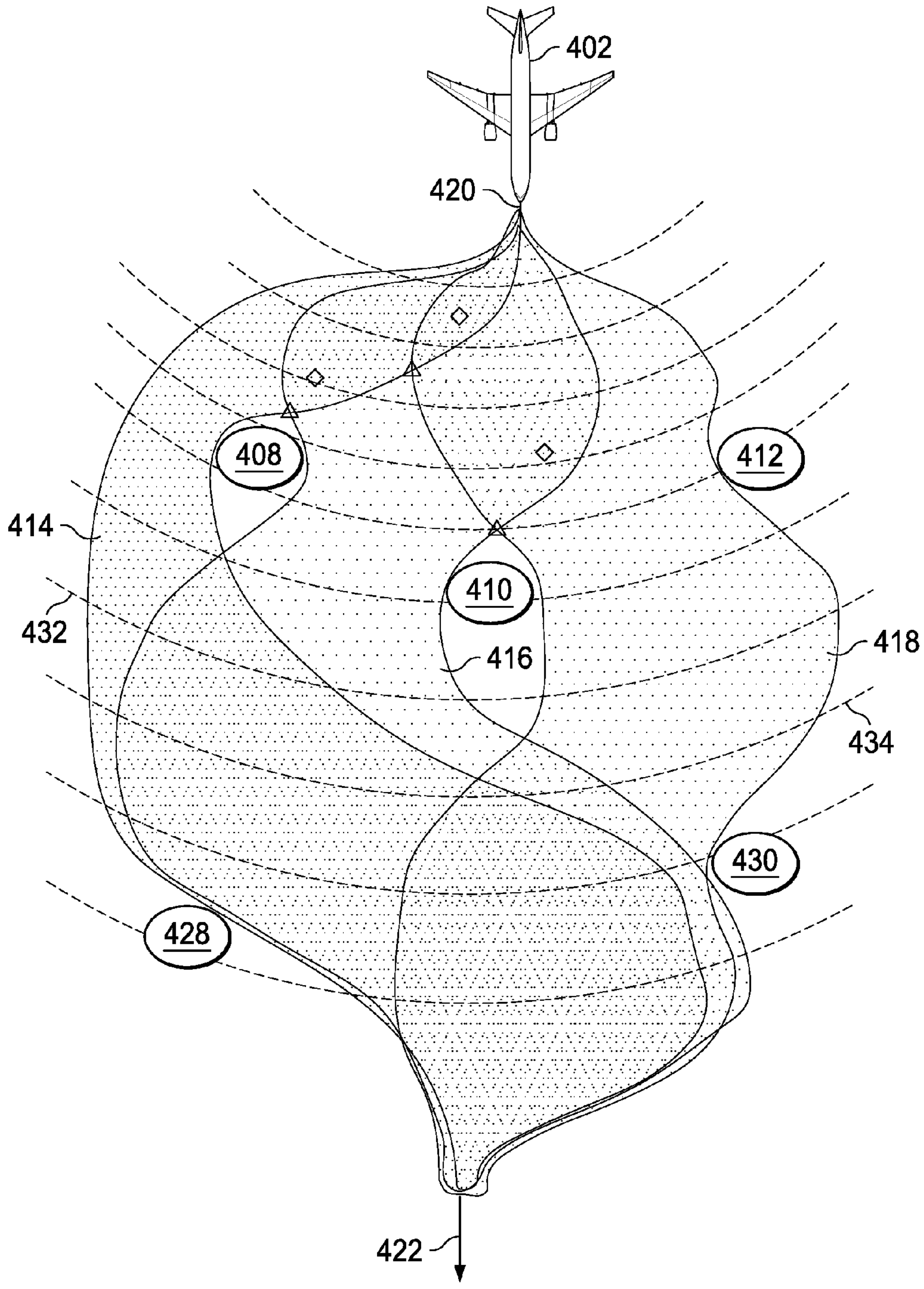
FIG. 4 is a diagram of a system of virtual predictive radar in accordance with an illustrative embodiment.

FIG. 4 is a diagram of a system of virtual predictive radar in accordance with an illustrative embodiment. Components shown in FIG. 4 are indexed to components shown in FIG. 1. Control vehicle 402 shown in FIG. 4 corresponds to control vehicle 102 shown in FIG. 1. Obstacle 408, obstacle 410, obstacle 412 shown in FIG. 4 correspond to obstacle 108, obstacle 110, obstacle 112 shown in FIG. 1. Fat path 414, fat path 416, fat path 418 shown in FIG. 4 correspond to fat path 114, fat path 116, fat path 118 shown in FIG. 1. Origination point 420 and destination point 422 shown in FIG. 4 correspond to origination point 120 and destination point 122, respectively, shown in FIG. 1. FIG. 4 also depicts several components that do not correspond to components depicted in FIG. 1. FIG. 4 depicts two additional obstacles, obstacle 428 and obstacle 430.

FIG. 4 also depicts time rings, two of which are labeled for discussion purposes, time ring 432 and time ring 434. While depicted in FIG. 4 as a ring, time ring 432 and time ring 434 may not be shaped in a ringlike fashion and may take on various shapes. Probabilities of vehicle arrival at a particular point at a particular time may also be associated with at least one of time ring 432 and time ring 434. Time ring 432 and time ring 434 may take on various dimensions in order to reflect uncertainty of location of control vehicle 402 at a given time. Time ring 432 and time ring 434 are not components of a system or method per se, but are rather representations of boundaries in time. As control vehicle 402 departs from origination point 420 and moves in the direction of destination point 422, control vehicle 402 crosses boundaries that may be set by application 106 of FIG. 1, including time ring 432 and time ring 434. Time ring 432 and time ring 434 may be used in calculating a time until control vehicle 402 would be expected to reach a divergence point of any combination of fat path 414, fat path 416, and fat path 418. Thus, these time rings may be valuable in determining locations of decision boundary 124. A decision boundary is not depicted in FIG. 4. Time ring 432 and time ring 434 would also be useful in determining positions of obstacle 408, obstacle 410, and obstacle 412, particularly if obstacle 408, obstacle 410, and obstacle 412 are in motion.

Figure 5:
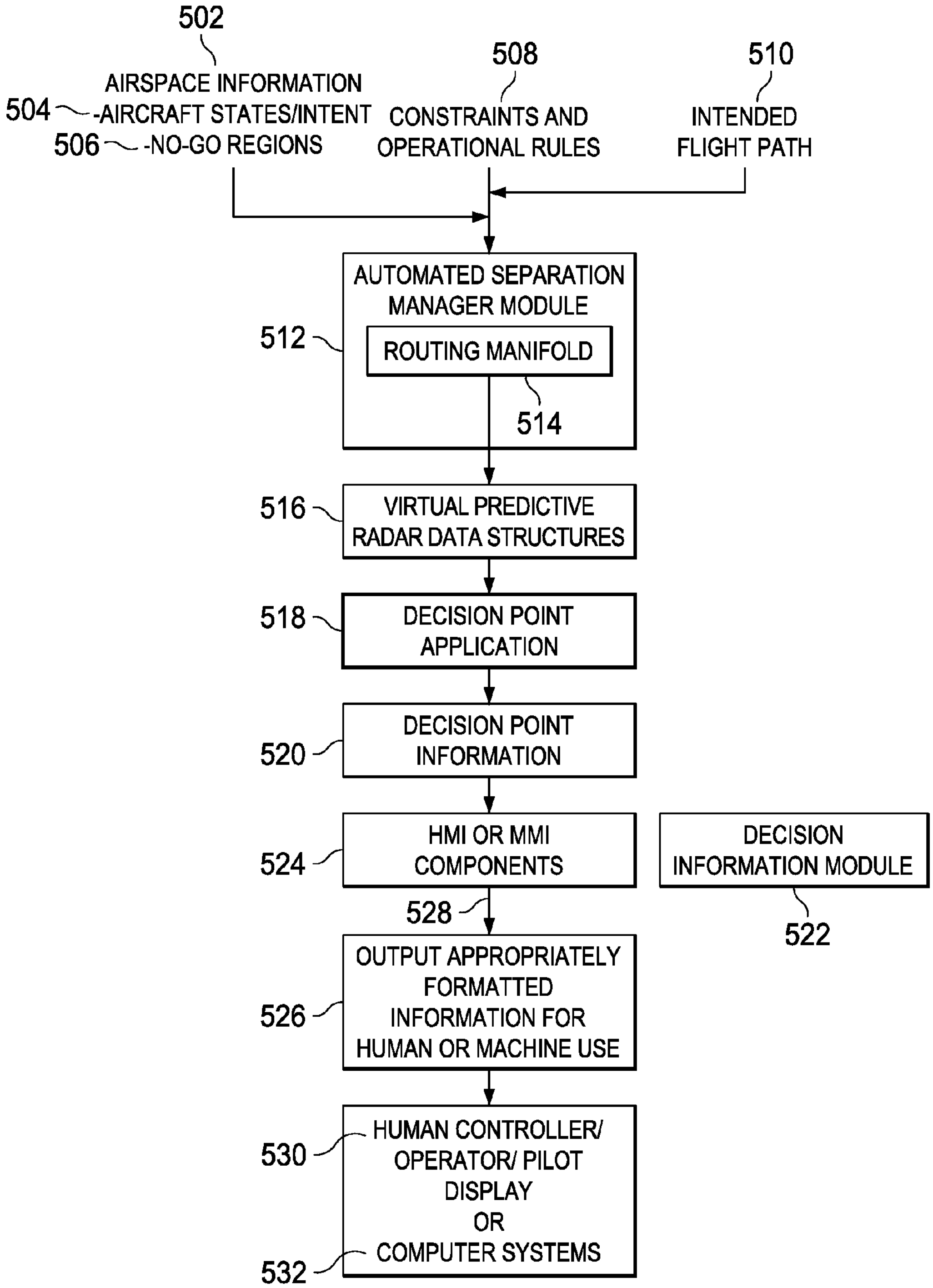
FIG. 5 is a chart illustrating routing decision software in use with a routing manifold generating application in accordance with an illustrative embodiment.

FIG. 5 is a chart illustrating routing decision software in use with a routing manifold generating application in accordance with an illustrative embodiment. FIG. 5 provides an illustration of the use of routing decision software. Inputs include airspace information 502 including aircraft states and intent 504. Airspace information also includes information about no-go regions 506 that may include obstacle 408, obstacle 410, and obstacle 412 of FIG. 4, other aircraft, no-fly zones, weather systems, terrain, and man-made objects. Inputs also include information including constraints and operational rules 508. Inputs also include intended flight path 510 of control vehicle 402 of FIG. 4.

An automated separation management module 512, which may be a component of application 106 of FIG. 1, may generate routing manifold 514. Output from routing manifold 514 may be stored in virtual predictive radar data structures 516 that are provided to decision point application 518. Decision point application 518 may be a component of application 106 of FIG. 1. Output including decision point information 520 is generated which includes options and annotated virtual predictive radar information. Output is fed to decision information module 522 that includes human-machine interface components and machine-machine interface components 524, represented respectively in FIG. 5 as HMI and MMI. Presentable output, using human-machine interface components and machine-machine interface components, is appropriately formatted for human or machine use 526. For human use, output 528 may be presented on a display for a human controller, operator, and/or pilot 530. For machine use, output is presented on computer systems 532.

Figure 6:
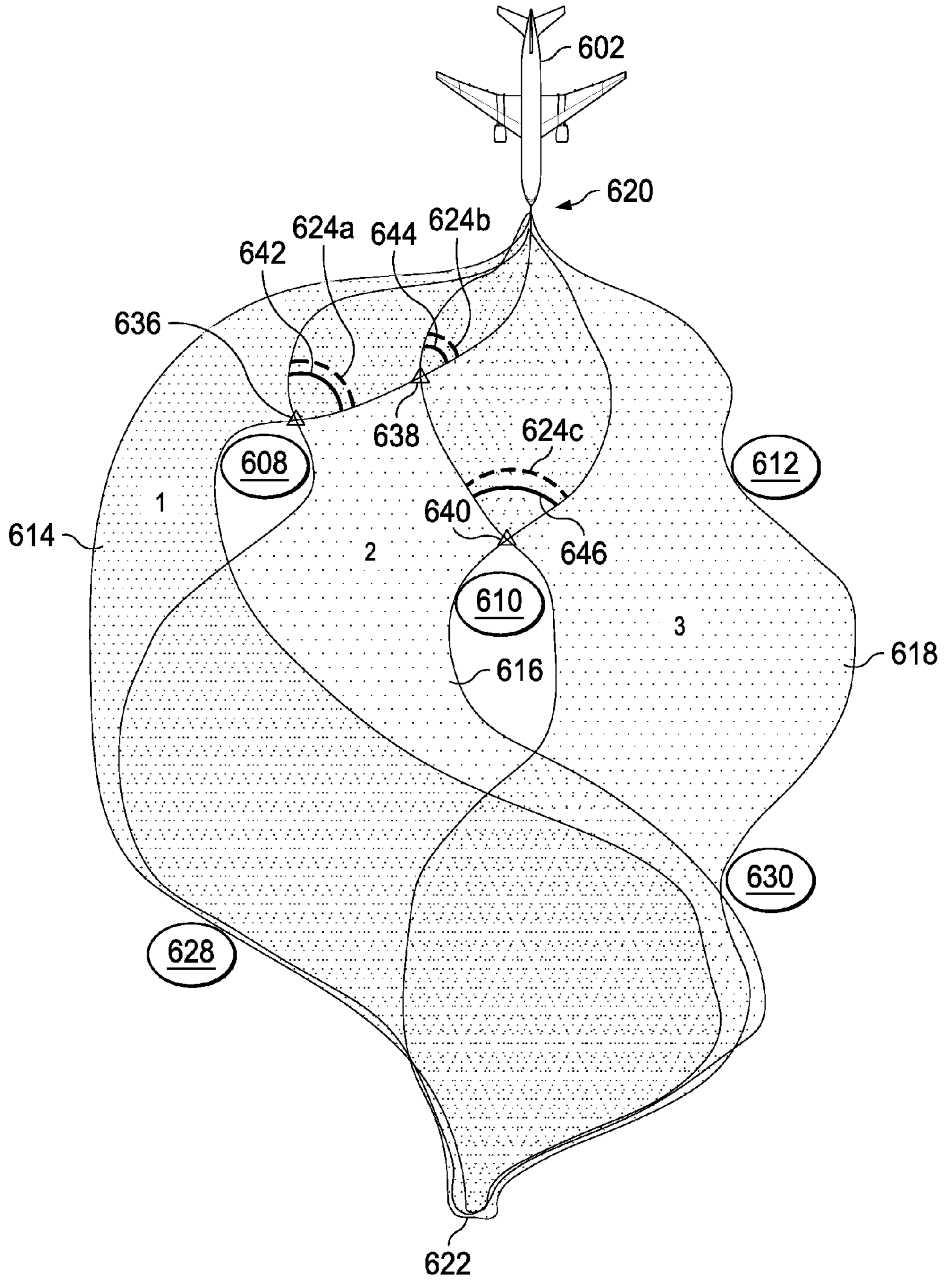
FIG. 6 is a diagram of a virtual predictive radar in accordance with an embodiment of the present disclosure.

FIG. 6 is a diagram of a virtual predictive radar in accordance with an embodiment of the present disclosure. Components shown in FIG. 6 are indexed to components shown in FIG. 1 and FIG. 4. Control vehicle 602 shown in FIG. 6 corresponds to control vehicle 102 shown in FIG. 1 and control vehicle 402 shown in FIG. 4. Obstacle 608, obstacle 610, obstacle 612 shown in FIG. 6 correspond to obstacle 108, obstacle 110, obstacle 112 shown in FIG. 1 and obstacle 408, obstacle 410, obstacle 412 shown in FIG. 4. Fat path 614, fat path 616, fat path 618 shown in FIG. 6 correspond to fat path 114, fat path 116, fat path 118 shown in FIG. 1 and fat path 414, fat path 416, and fat path 418 shown in FIG. 4. Origination point 620, destination point 622, and decision boundary 624*a*, decision boundary 624*b*, and decision boundary 624*c* shown in FIG. 6 correspond to origination point 120, destination point 122, and decision boundary 124, respectively, shown in FIG. 1. Origination point 620 and destination point 622 in FIG. 6 correspond to origination point 420 and destination point 422, respectively, shown in FIG. 4. FIG. 6 depicts two additional obstacles not depicted in FIG. 1, obstacle 628 and obstacle 630 that correspond to obstacle 428 and obstacle 430 in FIG. 4.

FIG. 6 depicts several components not previously enumerated or depicted. FIG. 6 depicts fat path intersection 636, fat path intersection 638, and fat path intersection 640. FIG. 6 also depicts theoretical event horizon 642, theoretical event horizon 644, and theoretical event horizon 646.

Fat path intersection 636 is an intersection of a boundary of fat path 614 and a boundary of fat path 616. Fat path intersection 638 is an intersection of boundary of fat path 614, boundary of fat path 616, and boundary of fat path 618. Fat path intersection 640 is an intersection of boundary of fat path 616 and boundary of fat path 618.

Theoretical event horizon 642 is associated with decision boundary 624*a*, theoretical event horizon 644 is associated with decision boundary 624*b*, and theoretical event horizon 646 is associated with decision boundary 624*c*.

At any point along one of decision boundary 624*a*, decision boundary 624*b*, or decision boundary 624*c*, control vehicle 602 would be provided at least one heading that would enable control vehicle 602 to safely choose a fork option to avoid at least one obstacle while observing constraints provided in routing manifold 126 of FIG. 1. For example, control vehicle 602 may be concurrently flying in fat path 616 and fat path 618 in the direction of obstacle 610. By the time control vehicle 602 reaches decision boundary 624*c*, application 106 will have evaluated speed, altitude, schedule adherence and other factors associated with control vehicle 602, and application 106 will have provided to control vehicle 602 or to ground control at least one heading. The at least one heading will promote control vehicle 602 to safely avoid obstacle 610 while continuing to observe constraints provided in routing manifold 126 of FIG. 1. In choosing from at least one heading, control vehicle 602 will choose a fork option that includes following fat path 616 or will choose a fork option that includes following fat path 618, both of which safely bypass obstacle 610.

Figure 7:
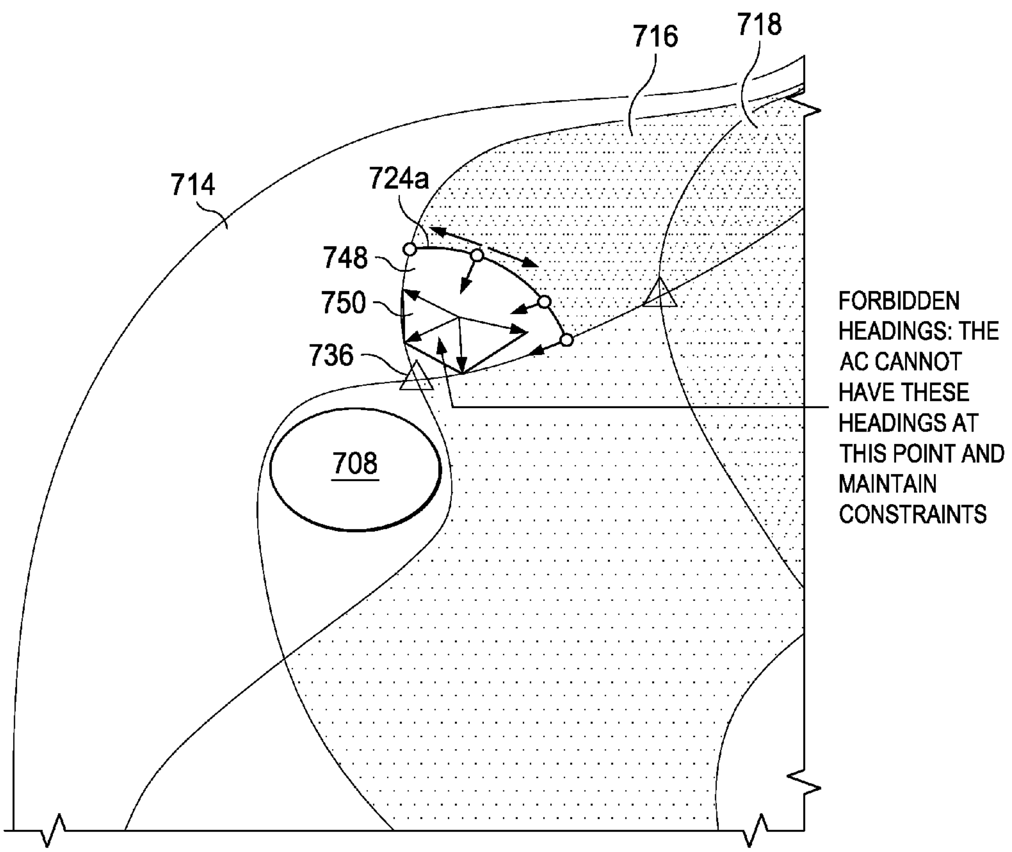
FIG. 7 is a diagram of a portion of a virtual predictive radar in accordance with an embodiment of the present disclosure.

FIG. 7 is a diagram of a portion of a virtual predictive radar in accordance with an embodiment of the present disclosure. Components in FIG. 7 correspond to components in FIG. 6. Fat path 714, fat path 716, and fat path 718 shown in FIG. 7 correspond to fat path 614, fat path 616, and fat path 618 shown in FIG. 6. Obstacle 708 shown in FIG. 7 corresponds to obstacle 608 shown in FIG. 6. Decision boundary 724*a* shown in FIG. 7 corresponds to decision boundary 624*a* shown in FIG. 6. Fat path intersection 736 shown in FIG. 7 corresponds to fat path intersection 636 shown in FIG. 6. FIG. 7 depicts practical event horizon region 748 which is an unshaded region bounded by decision boundary 724*a*, a boundary of fat path 714, and a boundary of fat path 716.

When control vehicle 102 of FIG. 1 crosses decision boundary 724*a* and enters event horizon region 748, application 106 of FIG. 1 will have provided at least one heading to control vehicle 102 to avoid obstacle 708. Application 106 may also provide at least one range of forbidden headings to control vehicle 102 of FIG. 1. The middle of the three smaller triangles within event horizon region 748 is pointed to. Within event horizon region 748, control vehicle 102 cannot have headings in a forbidden heading range while maintaining constraints provided in routing manifold 126 of FIG. 1. Should control vehicle 102 be situated in that triangular section of event horizon region, control vehicle 102 might be required to take action to avoid collision with obstacle 708 and will likely violate constraints regarding speed, altitude, safety, or passenger comfort. Arrows depicted in FIG. 7 are associated with various headings control vehicle 102 may assume, some of which may promote control vehicle observing constraints and safely avoiding obstacle 708.

Within event horizon region 748, in order to maintain constraints control vehicle 102 of FIG. 1 must maintain heading towards one particular fork option. Heading fan 750 is associated with a point within event horizon region 748 and contains all headings that direct control vehicle 102 from that point toward the fork option in fat path 714. At a point on decision boundary 724*a*, a heading orthogonal to decision boundary 724*a* at that point may be the only heading that is feasible for both fat path 714 and fat path 716. If control vehicle 102 reaches a location within event horizon region 748, then a decision on which of fat path 714 and fat path 716 has already been made. Each point within event horizon region 748 may have an associated fan of forbidden headings. If control vehicle 102 has a forbidden heading, control vehicle 102 may be unable to avoid incursion or may be unable to avoid violating current maneuver constraints. As used herein a "forbidden area" means an area in which constraints must be modified in order to avoid incursion with obstacle 708.

Figure 8:
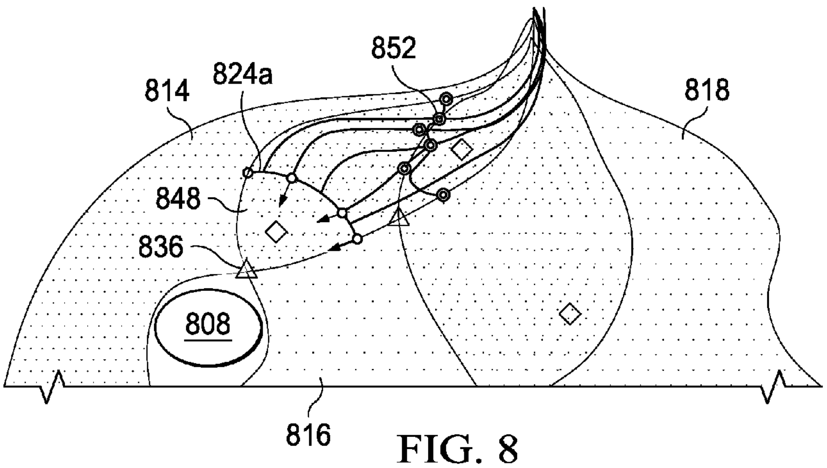
FIG. 8 is a diagram of a portion of a virtual predictive radar in accordance with an embodiment of the present disclosure.

FIG. 8 is a diagram of a portion of a virtual predictive radar in accordance with an embodiment of the present disclosure. Components in FIG. 8 correspond to some components in FIG. 7. Fat path 814, fat path 816, and fat path 818 shown in FIG. 8 correspond to fat path 714, fat path 716, and fat path 718 shown in FIG. 7. Obstacle 808 shown in FIG. 8 corresponds to obstacle 708 shown in FIG. 7. Decision boundary 824*a* shown in FIG. 8 corresponds to decision boundary 724*a* shown in FIG. 7. Fat path intersection 836 shown in FIG. 8 corresponds to fat path intersection 736 shown in FIG. 7. Practical event horizon region 848 shown in FIG. 8 corresponds to practical event horizon region 748 shown in FIG. 7.

FIG. 8 depicts event horizon avoidance boundary 852 which is associated with decision boundary 824*a* and is a maximal intersection of fat path 814, fat path 816, and fat path 818. Control vehicle 102 of FIG. 1 must have initiated a maneuver onto an option for at least one of fat path 814, fat path 816, and fat path 818 at the time of reaching event horizon avoidance boundary 852. Control vehicle 102 may be unable to safely invoke a change of heading onto a different option after reaching decision boundary 824*a*, assuming practical event horizon region 848 is to be avoided.

Figure 9:
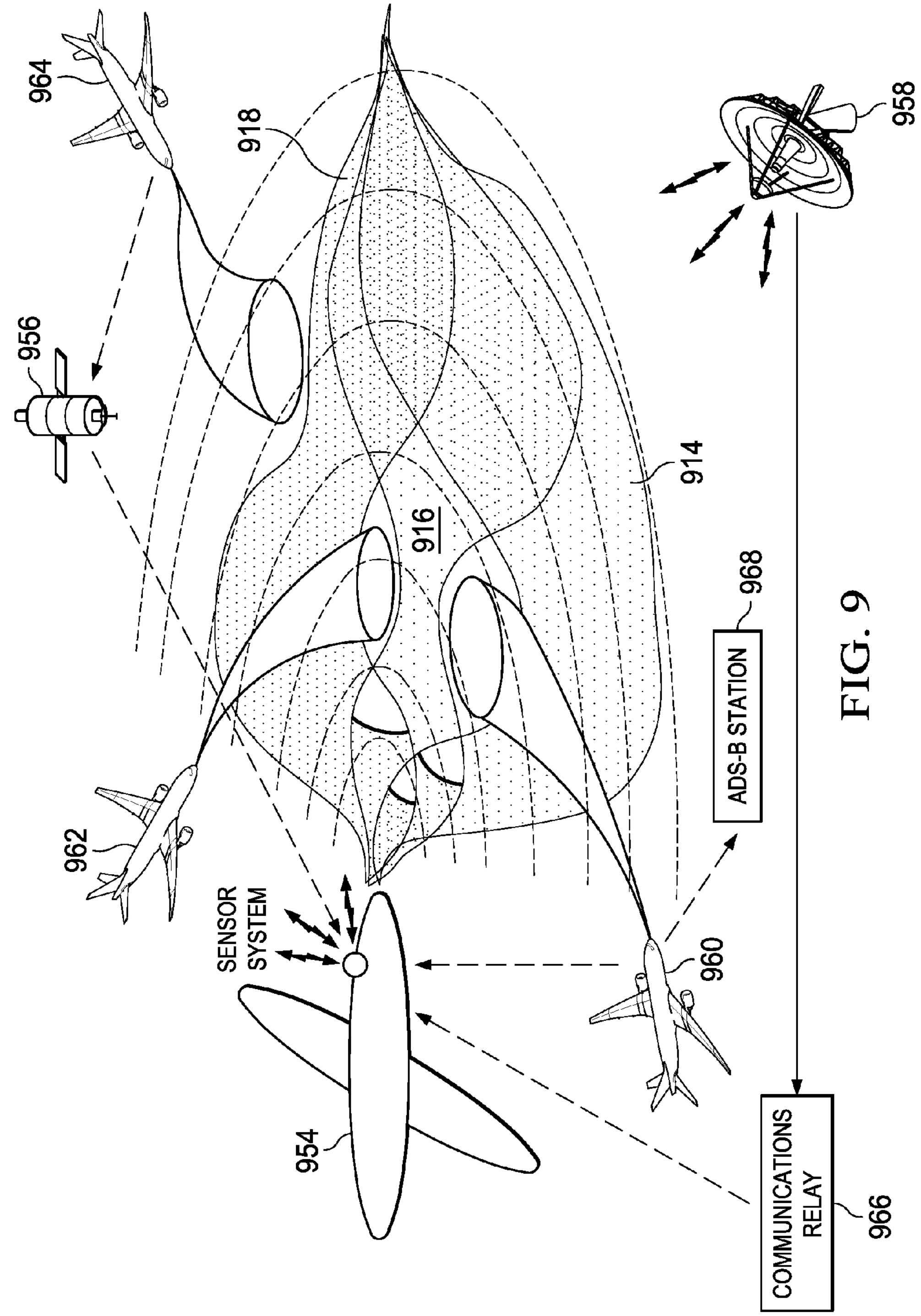
FIG. 9 is a diagram of a virtual predictive radar in accordance with an embodiment of the present disclosure.

FIG. 9 is a diagram of a virtual predictive radar in accordance with an embodiment of the present disclosure. Fat path 914, fat path 916, and fat path 918 shown in FIG. 9 correspond to fat path 814, fat path 816, and fat path 818 shown in FIG. 8. FIG. 9 depicts an alternate use of components of system 100. FIG. 9 depicts unmanned aerial vehicle 954, satellite 956, radar 958, aircraft 960, aircraft 962, aircraft 964, communications relay 966, and automatic dependence surveillance-broadcast (ADS-B) station 968. Unmanned aerial vehicle 954 receives data on aircraft 960, aircraft 962, aircraft 964 including their flight paths. Unmanned aerial vehicle 954 accesses software on board and generates routing segments for aircraft 960, aircraft 962, aircraft 964 using methods provided herein.

Unmanned aerial vehicle 954 may receive information on other aircraft 960, aircraft 962, and aircraft 964 in the region. Software or other components that may be aboard unmanned aerial vehicle 954 may route and reroute segments using the four-dimensional virtual protective radar method with decision point enhancement.

Figure 10:
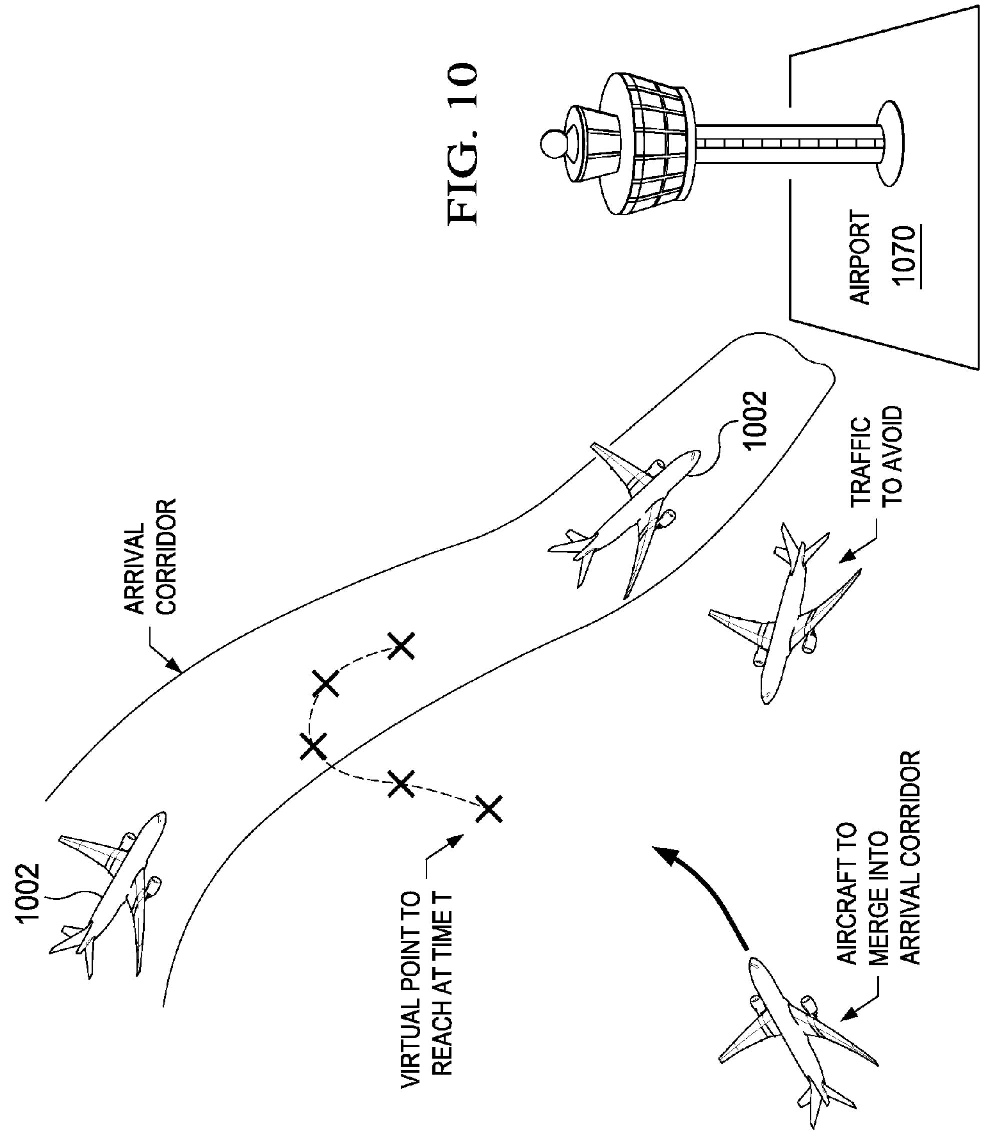
FIG. 10 is a diagram illustrating a use case in accordance with an embodiment of the present disclosure.

FIG. 10 is a diagram illustrating a use case in accordance with an embodiment of the present disclosure. Control vehicle 1002 shown in FIG. 10 corresponds to control vehicle 602 shown in FIG. 6 and control vehicle 102 shown in FIG. 1. Airport 1070 is depicted in FIG. 10. The systems and methods provided herein could be used to coordinate assets in a mission scenario or sequencing into an arrival stream at airport 1070. Interoperation of a feasible heading fan and an avoidance heading fan may be reversed so that heading avoidance range becomes feasible heading range for reaching a target and feasible heading range becomes avoidance heading range.

Use of decision boundaries may be modified in cases such as depicted in FIG. 10 such that, for instance, a theoretical event horizon may be a time and location at which control vehicle 1002 must be on a heading orthogonal to decision boundary. Such a requirement of control vehicle 1002 being on a heading orthogonal to decision boundary may be appropriate to assure or increase likelihood of reaching target at correct time given speed of control vehicle 1002 and anticipated trajectory or location of target. Target may be a virtual moving point in a case when sequencing aircraft into an arrival stream of airport 1070 or joining or maintaining a formation of aircraft.

Figure 11:
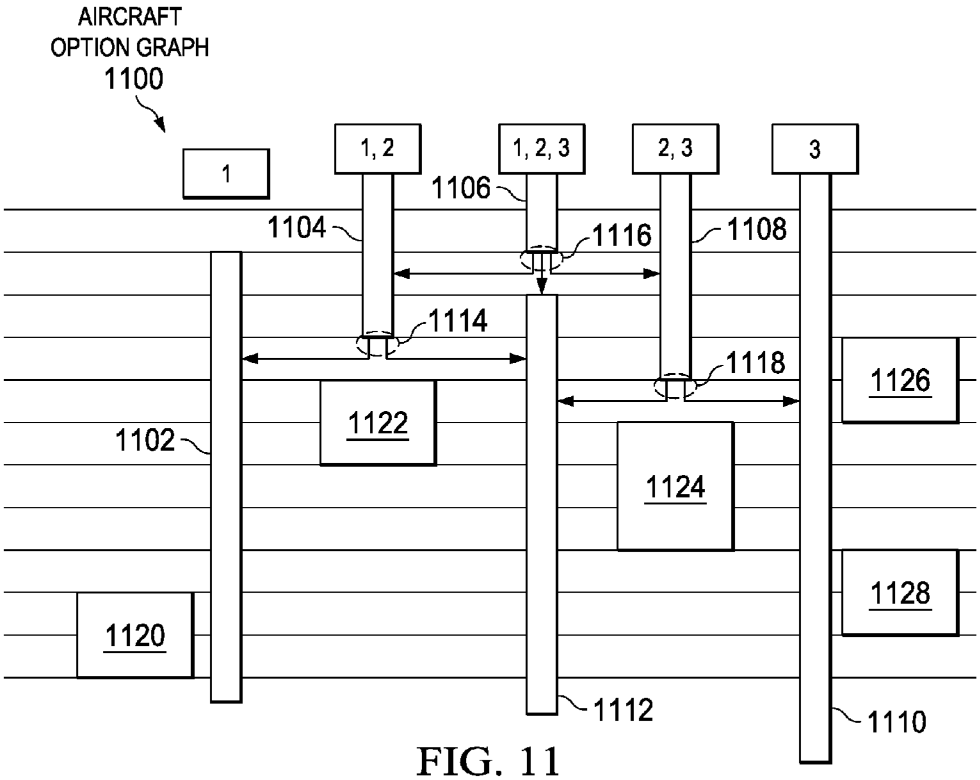
FIG. 11 is an aircraft option graph in accordance with an embodiment of the present disclosure.

FIG. 11 is an aircraft option graph 1100 in accordance with an embodiment of the present disclosure. FIG. 11 depicts fat path bar 1102, fat path bar 1104, fat path bar 1106, fat path bar 1108, fat path bar 1110, and fat path bar 1112. Fat path bar 1102 and fat path bar 1110 are labeled by "1" and "3" respectively, to indicate that fat path bar 1102 and fat path bar 1110 represent portions of fat path 1 and fat path 3, respectively, that intersect no other fat path. Fat path bar 1104, fat path bar 1106, and fat path bar 1108 represent maximal fat path intersections associated with fat path labels "1,2", "1,2,3", and "2,3" respectively. Fat path intersections represented by fat path bar 1104 and fat path bar 1108 are also fork options for fat path intersection represented by fat path bar 1106. A number of directed arrows are provided wherein each directed arrow from one fat path bar to other fat path bars represents a feasible transition from the fat path intersection represented by the fat path bar to a fork option. Divergence point 1114, divergence point 1116, and divergence point 1118 are each represented by an end of a fat path bar with directed arrows. A bar with all arrows directed from it represents a fork. Decision boundaries and event horizon regions may also be represented. Aircraft option graphs may contain geometric objects that represent objects or areas to avoid. FIG. 11 depicts obstacle 1120, obstacle 1122, obstacle 1124, obstacle 1126, and obstacle 1128. Aircraft option graphs may contain curves that represent time progress.

For example, control vehicle 102 of FIG. 1 may be traveling along fat path bar 1104. From fat path bar 1104 control vehicle 102 may proceed on either fat path bar 1102 or fat path bar 1112 and thereby avoid obstacle 1122.

Figure 12:
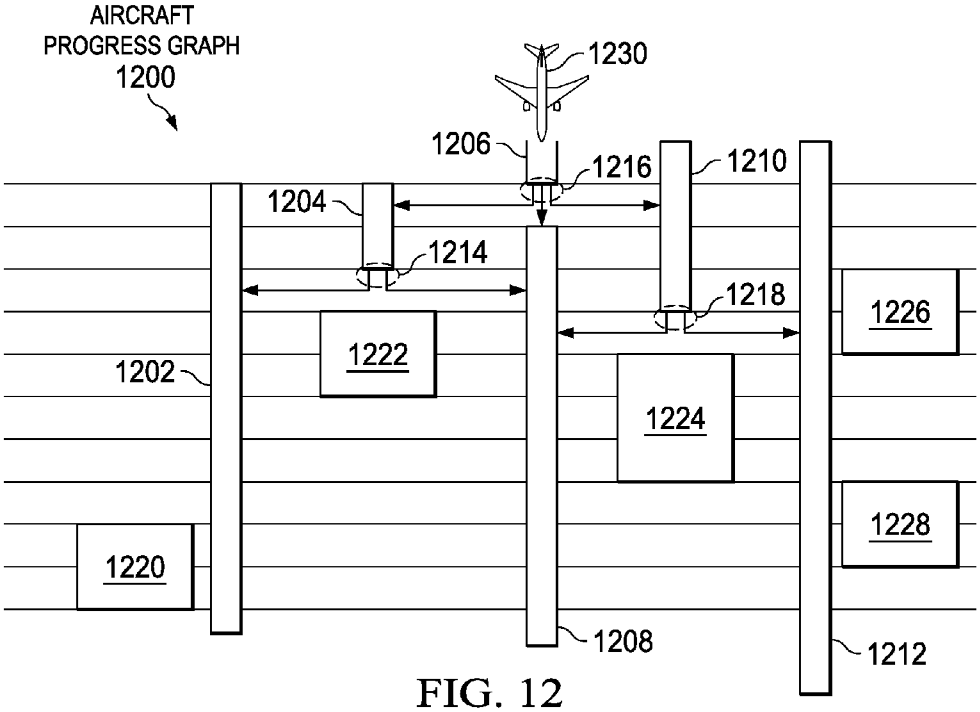
FIG. 12 is an aircraft progress graph in accordance with an embodiment of the present disclosure.
Figure 13:
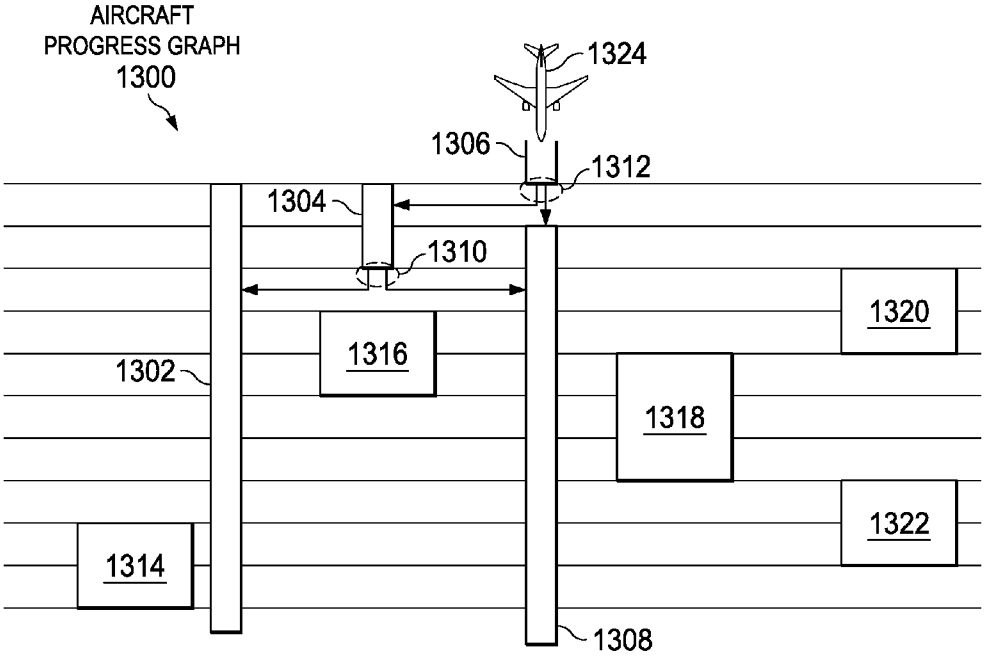
FIG. 13 is an aircraft progress graph in accordance with an embodiment of the present disclosure.

FIG. 12 and FIG. 13 are aircraft progress graph 1200 and aircraft progress graph 1300, respectively, that contain a plurality of distinct bars, one for each feasible intersection of fat paths. FIG. 12 depicts fat path bar 1202, fat path bar 1204, fat path bar 1206, fat path bar 1208, fat path 1210, and fat path bar 1212. FIG. 13 depicts fat path bar 1302, fat path bar 1304, fat path bar 1306, and fat path bar 1308. A number of directed arrows are provided wherein each directed arrow from one fat path bar to other fat path bars represent a feasible transition from a fat path intersection to a fork option. FIG. 12 also depicts divergence point 1214, divergence point 1216, and divergence point 1218. FIG. 13 depicts divergence point 1310 and divergence point 1312. A bar with all arrows directed from it represents a fork. Decision boundaries and event horizon regions may also be represented. Vehicle progress graphs may contain geometric objects that represent objects or areas to avoid. FIG. 12 depicts obstacle 1220, obstacle 1222, obstacle 1224, obstacle 1226, and obstacle 1228. FIG. 13 depicts obstacle 1314, obstacle 1316, obstacle 1318, obstacle 1320, and obstacle 1322. The vehicle progress graphs shown may contain a number of curves that represent time progress.

In vehicle progress graphs, graph elements occurring prior to the current time are erased. Graph elements representing options no longer available due to vehicle progress are erased. Graph elements representing remaining options that necessitate a change in vehicle heading in order to remain feasible may be shown with particular coloring or other symbolic indication such as being cross hatched. Necessary or desired heading changes may also be indicated. Optimal headings for sequence of times within each bar may be indicated. Depictions of current vehicle locations are contained. If a vehicle enters a forbidden heading zone, an indication such as the vehicle flashing or turning color may be displayed.

FIG. 13 may be viewed as continuation of FIG. 12. Control vehicle 102 depicted in FIG. 1 is depicted in FIG. 12 as control vehicle 1230 and is depicted in FIG. 13 as control vehicle 1324. As control vehicle 1230 moves along fat path 1206, the operator of control vehicle 1230 or another party or component may choose to follow an option leading to fat path bar 1204 and fat path bar 1208. Transitioning to FIG. 13, control vehicle 1324 (control vehicle 1230 in FIG. 12) is depicted entering an event horizon region. Options no longer remaining (fat path bar 1210 and 1212 depicted in FIG. 12) have been erased in FIG. 13 relative to FIG. 12, and thus are not depicted in FIG. 13.

Figure 14:
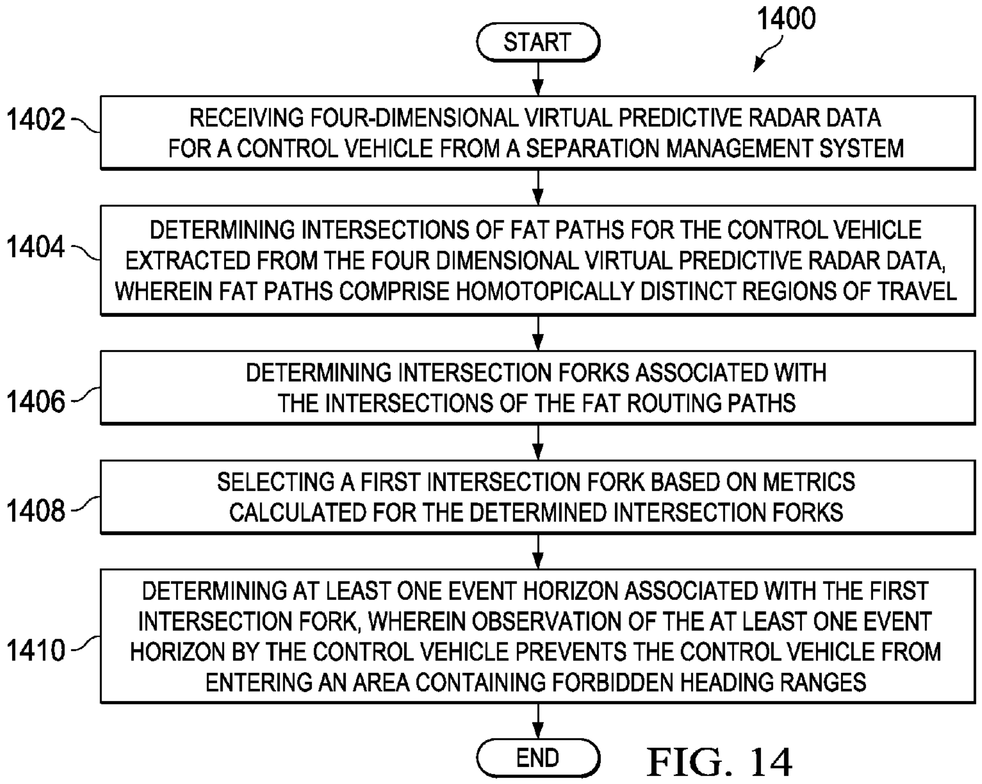
FIG. 14 is a flowchart of a method for routing systems in a separation management system in accordance with an illustrative embodiment.

FIG. 14 is a flowchart of a method for routing systems in a separation management system in accordance with an illustrative embodiment. Method 1400 shown in FIG. 14 may be implemented using system 100 of FIG. 1. The process shown in FIG. 2 may be implemented by a processor, such as processor unit 1504 of FIG. 15. The process shown in FIG. 14 may be a variation of the processes shown in FIG. 1 and FIG. 3 through FIG. 13. Although the operations presented in FIG. 14 are described as being performed by a "process," the operations are being performed by at least one tangible processor or using one or more physical devices, as described elsewhere herein. The term "process" also includes computer instructions stored on a non-transitory computer readable storage medium.

Method 1400 may begin as the process receives four-dimensional virtual predictive radar data for a control vehicle from a separation management system (operation 1402). Thus, computer 104 may receive four-dimensional virtual predictive radar data for a control vehicle from a separation management system. Next, the process may determine intersections of fat paths for the control vehicle extracted from the four dimensional virtual predictive radar data, wherein fat paths comprise homotopically distinct regions of travel (operation 1404). For, example, computer 104 may determine intersections of fat paths for the control vehicle extracted from the four dimensional virtual predictive radar data, wherein fat paths comprise homotopically distinct regions of travel.

The process may determine intersection forks associated with the intersections of the fat routing paths (operation 1406). Next, the process may select a first intersection fork based on metrics calculated for the determined intersection forks (operation 1408). Next, the process may determine at least one event horizon associated with the first intersection fork, wherein observation of the at least one event horizon by the control vehicle prevents the control vehicle from entering an area containing forbidden heading ranges (operation 1410). Operations 1406, 1408, and 1410 may be implemented using computer 104 of FIG. 1. Method 1400 may terminate thereafter.

Figure 15:
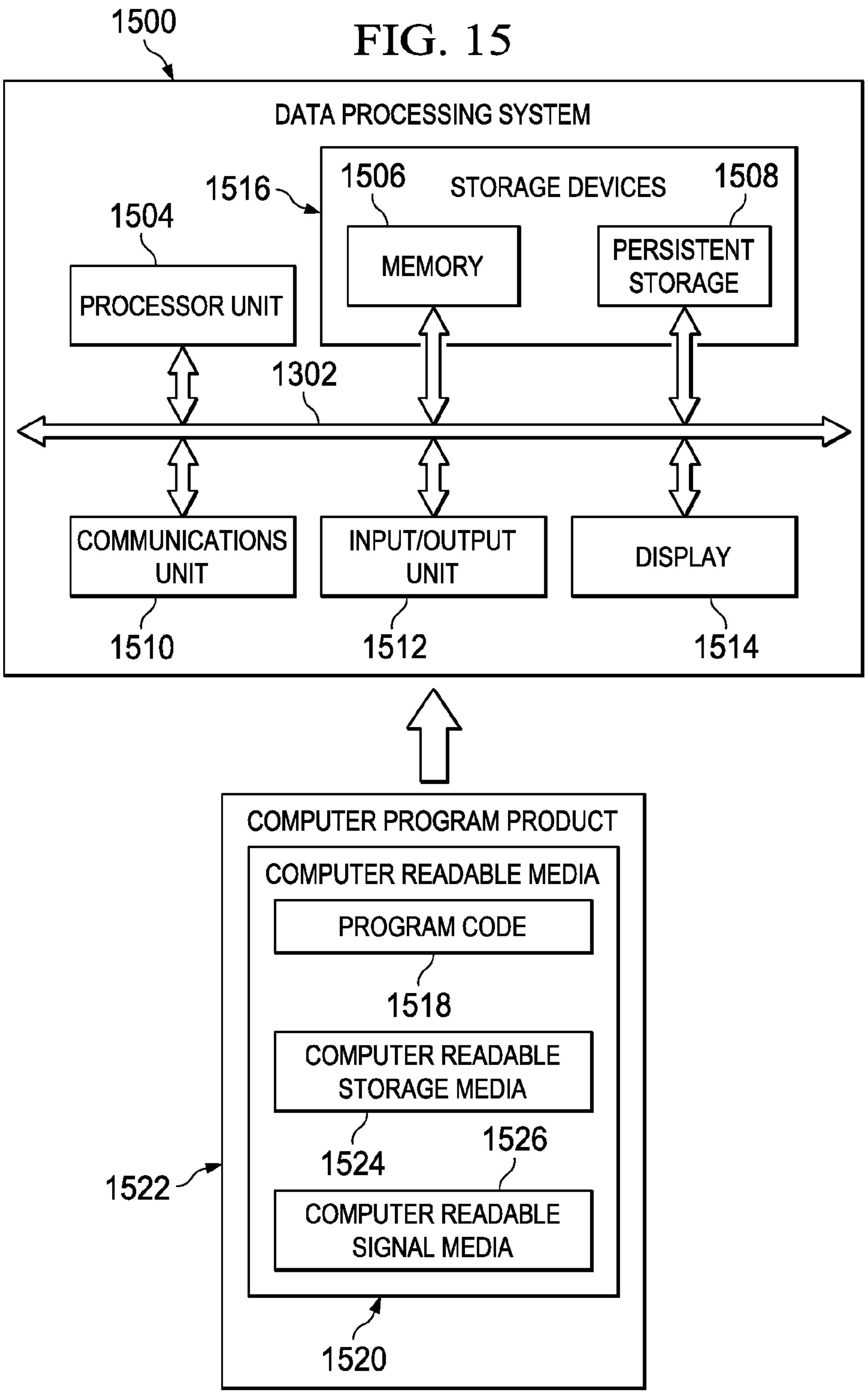
FIG. 15 is an illustration of a data processing system, in accordance with an illustrative embodiment.

Turning now to FIG. 15, an illustration of a data processing system is depicted in accordance with an illustrative embodiment. Data processing system 1500 in FIG. 15 is an example of a data processing system that may be used to implement the illustrative embodiments, such as system 100 of FIG. 1, or any other module or system or process disclosed herein. In this illustrative example, data processing system 1500 includes communications fabric 1502, which provides communications between processor unit 1504, memory 1506, persistent storage 1508, communications unit 1510, input/output (I/O) unit 1512, and display 1514.

Processor unit 1504 serves to execute instructions for software that may be loaded into memory 1506. Processor unit 1504 may be a number of processors, a multi-processor core, or some other type of processor, depending on the particular implementation. A number, as used herein with reference to an item, means one or more items. Further, processor unit 1504 may be implemented using a number of heterogeneous processor systems in which a main processor is present with secondary processors on a single chip. As another illustrative example, processor unit 1504 may be a symmetric multi-processor system containing multiple processors of the same type.

Memory 1506 and persistent storage 1508 are examples of storage devices 1516. A storage device is any piece of hardware that is capable of storing information, such as, for example, without limitation, data, program code in functional form, and/or other suitable information either on a temporary basis and/or a permanent basis. Storage devices 1516 may also be referred to as computer readable storage devices in these examples. Memory 1506, in these examples, may be, for example, a random access memory or any other suitable volatile or non-volatile storage device. Persistent storage 1508 may take various forms, depending on the particular implementation.

For example, persistent storage 1508 may contain one or more components or devices. For example, persistent storage 1508 may be a hard drive, a flash memory, a rewritable optical disk, a rewritable magnetic tape, or some combination of the above. The media used by persistent storage 1508 also may be removable. For example, a removable hard drive may be used for persistent storage 1508.

Communications unit 1510, in these examples, provides for communications with other data processing systems or devices. In these examples, communications unit 1510 is a network interface card. Communications unit 1510 may provide communications through the use of either or both physical and wireless communications links.

Input/output (I/O) unit 1512 allows for input and output of data with other devices that may be connected to data processing system 1500. For example, input/output (I/O) unit 1512 may provide a connection for user input through a keyboard, a mouse, and/or some other suitable input device. Further, input/output (I/O) unit 1512 may send output to a printer. Display 1514 provides a mechanism to display information to a user.

Instructions for the operating system, applications, and/or programs may be located in storage devices 1516, which are in communication with processor unit 1504 through communications fabric 1502. In these illustrative examples, the instructions are in a functional form on persistent storage 1508. These instructions may be loaded into memory 1506 for execution by processor unit 1504. The processes of the different embodiments may be performed by processor unit 1504 using computer implemented instructions, which may be located in a memory, such as memory 1506.

These instructions are referred to as program code, computer usable program code, or computer readable program code that may be read and executed by a processor in processor unit 1504. The program code in the different embodiments may be embodied on different physical or computer readable storage media, such as memory 1506 or persistent storage 1508.

Program code 1518 is located in a functional form on computer readable media 1520 that is selectively removable and may be loaded onto or transferred to data processing system 1500 for execution by processor unit 1504. Program code 1518 and computer readable media 1520 form computer program product 1522 in these examples. In one example, computer readable media 1520 may be computer readable storage media 1524 or computer readable signal media 1526. Computer readable storage media 1524 may include, for example, an optical or magnetic disk that is inserted or placed into a drive or other device that is part of persistent storage 1508 for transfer onto a storage device, such as a hard drive, that is part of persistent storage 1508. Computer readable storage media 1524 also may take the form of a persistent storage, such as a hard drive, a thumb drive, or a flash memory, that is connected to data processing system 1500. In some instances, computer readable storage media 1524 may not be removable from data processing system 1500.

Alternatively, program code 1518 may be transferred to data processing system 1500 using computer readable signal media 1526. Computer readable signal media 1526 may be, for example, a propagated data signal containing program code 1518. For example, computer readable signal media 1526 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 1518 may be downloaded over a network to persistent storage 1508 from another device or data processing system through computer readable signal media 1526 for use within data processing system 1500. For instance, program code stored in a computer readable storage medium in a server data processing system may be downloaded over a network from the server to data processing system 1500. The data processing system providing program code 1518 may be a server computer, a client computer, or some other device capable of storing and transmitting program code 1518.

The different components illustrated for data processing system 1500 are not meant to provide architectural limitations to the manner in which different embodiments may be implemented. The different illustrative embodiments may be implemented in a data processing system including components in addition to or in place of those illustrated for data processing system 1500. Other components shown in FIG. 15 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 1504 may take the form of a hardware unit that has circuits that are manufactured or configured for a particular use. This type of hardware may perform operations without needing program code to be loaded into a memory from a storage device to be configured to perform the operations.

For example, when processor unit 1504 takes the form of a hardware unit, processor unit 1504 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 1518 may be omitted because the processes for the different embodiments are implemented in a hardware unit.

In still another illustrative example, processor unit 1504 may be implemented using a combination of processors found in computers and hardware units. Processor unit 1504 may have a number of hardware units and a number of processors that are configured to run program code 1518. With this depicted example, some of the processes may be implemented in the number of hardware units, while other processes may be implemented in the number of processors.

As another example, a storage device in data processing system 1500 is any hardware apparatus that may store data. Memory 1505, persistent storage 1508, and computer readable media 1520 are examples of storage devices in a tangible form.

In another example, a bus system may be used to implement communications fabric 1502 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 1505, or a cache, such as found in an interface and memory controller hub that may be present in communications fabric 1502.

Data processing system 1500 may also include associative memory 1528. Associative memory 1528 may be in communication with communications fabric 1502. Associative memory 1528 may also be in communication with, or in some illustrative embodiments, be considered part of storage devices 1516. While one associative memory 1528 is shown, additional associative memories may be present.

The different illustrative embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non-limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer usable or computer readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems or remote printers or storage devices through intervening private or public networks. Non-limiting examples of modems and network adapters are just a few of the currently available types of communications adapters.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method using a computer in conjunction with a non-transitory computer readable storage medium, the method comprising:

the computer receiving at least one of time-referenced and location-referenced state data for an object of interest;

the computer determining a present location of a control vehicle within two presently overlapping fat paths wherein a fat path comprises a homotopically distinct region of travel;

the computer determining distance of the control vehicle from a point of divergence of the fat paths, the fat paths diverging to avoid the object of interest;

the computer generating a decision boundary reachable prior in time to the point of divergence wherein the decision boundary is in advance of the present location of the control vehicle;

the computer generating a first set of feasible headings and a second set of feasible headings for the control vehicle, the first set and the second set respectively associated with a projected first crossing point and a projected second crossing point of the decision boundary by the control vehicle wherein feasible headings promote positioning of the control vehicle in one of the fat paths beyond point of divergence; and the computer sending the first set of feasible headings and the second set of feasible headings to the control vehicle prior to the control vehicle reaching the decision boundary.

2. The method of claim 1, wherein the object of interest comprises at least one of a moving vehicle, a stationary object, a terrain object, a no-fly zone, a restricted operating zone, or a weather system proximate the control vehicle and combinations thereof.

3. The method of claim 2, wherein the object of interest is the moving vehicle, and wherein the control vehicle and the moving vehicle each are one of aircraft, watercraft, submarines, or ground vehicles.

4. The method of claim 1, further comprising the computer generating maneuver manifold information for the control vehicle.

5. The method of claim 4, wherein the at least one decision boundary comprises one or more points in at least one of space or time past which an operator of the control vehicle cannot invoke a change of heading from a first routing path to a second routing path while meeting constraints described in the maneuver manifold information.

6. The method of claim 1, wherein first set of feasible headings and the second set of feasible headings direct the control vehicle to a first fork option and a second fork option, respectively, and wherein following one of the first fork option and the second fork option promotes reaching a destination on schedule and promotes meeting of maneuver constraints and operational constraints.

7. The method of claim 1, wherein the computer is at least one of installed aboard the control vehicle, installed aboard an unmanned aircraft system, and installed at an air traffic control center.

8. The method of claim 1, wherein the determined heading range is communicated to one of a human operator of the control vehicle, a non-human operator of the control vehicle, or an air traffic controller.

9. The method of claim 1, wherein the computer generates optimal heading to maximize routing options of the control vehicle.

10. An aircraft comprising:

a fuselage configured for flight;

a computer, comprising:

a bus;

a processor connected to the bus; and a memory connected to the bus, the memory storing program code which, when executed by the processor, performs a computer-implemented method, the program code comprising:

program code for, using the processor, receiving at least one of time-referenced state data and location-referenced state data for an object of interest;

program code for, using the processor, determining a present location of the aircraft within two presently overlapping fat paths wherein a fat path comprises a homotopically distinct region of travel;

program code for, using the processor, determining distance of the aircraft from a point of divergence of the fat paths, the fat paths diverging to avoid the object of interest;

program code for, using the processor, generating a decision boundary reachable prior in time to the point of divergence wherein the decision boundary is in advance of the present location of the aircraft;

program code for, using the processor, generating a first set of feasible headings and a second set of feasible headings for the aircraft, the first set and the second set respectively associated with a projected first crossing point and a projected second crossing point of the decision boundary by the aircraft wherein feasible headings promote positioning of the aircraft in one of the fat paths beyond point of divergence; and program code for, using the processor, sending the first set of feasible headings and the second set of feasible headings to the aircraft prior to the aircraft reaching the decision boundary.

11. The aircraft of claim 10, wherein the program code is further for, using the processor, receiving maneuver manifold information for the aircraft comprising maneuver constraints and operational constraints.

12. The aircraft of claim 11, wherein the decision boundary comprises a point in one of space or time after which an operator of the aircraft cannot invoke a change of heading from a first routing path to a second routing path while meeting constraints described in the maneuver manifold information.

13. The aircraft of claim 10, wherein the program code is further for determining, using the processor, heading ranges from points where the aircraft is located and from points where the aircraft is not located.

14. The aircraft of claim 10, wherein the program code is further for, using the processor, generating an optimal heading to maximize routing options of the aircraft.

15. A non-transitory computer readable storage medium storing program code which, when executed by a processor, generates feasible headings for a control vehicle, the program code comprising:

program code for receiving at least one of time-referenced and location-referenced state data for an object of interest;

program code for determining a present location of the control vehicle within two presently overlapping fat paths wherein a fat path comprises a homotopically distinct region of travel;

program code for determining distance of the control vehicle from a point of divergence of the fat paths, the fat paths diverging to avoid the object of interest;

program code for generating a decision boundary reachable prior in time to the point of divergence wherein the decision boundary is in advance of the present location of the control vehicle;

program code for generating a first set of feasible headings and a second set of feasible headings for the control vehicle, the first set and the second set respectively associated with a projected first crossing point and a projected second crossing point of the decision boundary by the control vehicle wherein feasible headings promote positioning of the control vehicle in one of the fat paths beyond point of divergence; and program code for sending the first set of feasible headings and the second set of feasible headings to the control vehicle prior to the control vehicle reaching the decision boundary.

16. The non-transitory computer readable storage medium of claim 15, wherein the object of interest comprises at least one of a moving vehicle, a stationary object, a terrain object, a no-fly zone, a restricted operating zone, or a weather system proximate the control vehicle and combinations thereof.

17. The non-transitory computer readable storage medium of claim 15, further comprising the computer generating maneuver manifold information for the control vehicle.

18. The non-transitory computer readable storage medium of claim 17, wherein the at least one decision boundary comprises one or more points in at least one of space or time past which an operator of the control vehicle cannot invoke a change of heading from a first routing path to a second routing path while meeting constraints described in the maneuver manifold information.

19. The non-transitory computer readable storage medium of claim 15, wherein first set of feasible headings and the second set of feasible headings direct the control vehicle to a first fork option and a second fork option, respectively, and wherein following one of the first fork option and the second fork option promotes reaching a destination on schedule and promotes meeting of maneuver constraints and operational constraints.

* * * * *